United States Patent
Warren et al.

(10) Patent No.: US 9,192,890 B2
(45) Date of Patent: Nov. 24, 2015

(54) INTEGRATED SORBENT INJECTION AND FLUE GAS DESULFURIZATION SYSTEM

(71) Applicant: Babcock & Wilcox Power Generation Group, Inc., Barberton, OH (US)

(72) Inventors: Eric M Warren, Medina, OH (US); Jeb W Gayheart, Streetsboro, OH (US); Anthony A Silva, Wadsworth, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 0 days.

(21) Appl. No.: 14/336,645

(22) Filed: Jul. 21, 2014

(65) Prior Publication Data
US 2015/0139882 A1 May 21, 2015

Related U.S. Application Data

(60) Provisional application No. 61/904,939, filed on Nov. 15, 2013.

(51) Int. Cl.
| | |
|---|---|
| *B01D 53/50* | (2006.01) |
| *B01D 53/81* | (2006.01) |
| *B01D 53/83* | (2006.01) |
| *B01D 53/86* | (2006.01) |

(52) U.S. Cl.
CPC .......... *B01D 53/508* (2013.01); *B01D 53/8631* (2013.01); *B01D 2251/404* (2013.01)

(58) Field of Classification Search
CPC .. B01D 53/1481; B01D 53/50; B01D 53/508; B01D 53/81; B01D 53/83
See application file for complete search history.

(56) References Cited

U.S. PATENT DOCUMENTS

| | | | | |
|---|---|---|---|---|
| 3,886,261 | A * | 5/1975 | Libutti ...................... | 423/243.05 |
| 5,084,256 | A * | 1/1992 | McElroy et al. ......... | 423/243.08 |
| 5,122,353 | A * | 6/1992 | Valentine ................. | 423/244.05 |
| 5,958,335 | A * | 9/1999 | Okazoe et al. ................... | 422/13 |
| 6,528,030 | B2 * | 3/2003 | Madden et al. ............... | 423/210 |
| 2002/0102189 | A1 * | 8/2002 | Madden et al. ............... | 422/168 |
| 2011/0268637 | A1 * | 11/2011 | Ukai et al. ..................... | 423/235 |
| 2013/0136679 | A1 * | 5/2013 | Nagayasu et al. ............. | 423/220 |
| 2014/0165888 | A1 * | 6/2014 | Johnson et al. ................ | 110/215 |

* cited by examiner

*Primary Examiner* — Timothy Vanoy
(74) *Attorney, Agent, or Firm* — Eric Marich

(57) ABSTRACT

An integrated sorbent injection, heat recovery, and flue gas desulfurization system is disclosed. A dry sorbent is injected into the flue gas upstream of the air heater. This reduces the acid dew point temperature, permitting additional heat energy to be captured when the flue gas passes through the air heater. The flue gas then passes through a desulfurization unit and through a baghouse, where solids are captured. The capture of additional heat energy permits the overall boiler efficiency to be increased while safely operating at a lower flue gas temperature. The integrated system consumes no greater quantity of sorbent than conventional methods but provides the benefit of improved plant heat rate.

17 Claims, 5 Drawing Sheets

PLAN VIEW

INTEGRATED SORBENT INJECTION AND FLUE GAS DESULFURIZATION SYSTEM

CROSS-REFERENCE TO RELATED APPLICATION

This application claims priority to U.S. Provisional Application Ser. No. 61/904,939, filed Nov. 15, 2013 entitled "Integrated Sorbent Injection and Flue Gas Desulfurization System". U.S. Provisional Application Ser. No. 61/904,939, filed Nov. 15, 2013 entitled "Integrated Sorbent Injection and Flue Gas Desulfurization System" is incorporated by reference herein in its entirety.

BACKGROUND

The present disclosure relates to a flue gas desulfurization (FGD) system which is used to remove particulates, gases, and other contaminants from flue gas produced during combustion of medium- to high-sulfur fuels. In particular, sulfur dioxide ($SO_2$), sulfur trioxide ($SO_3$), HCl, and other acid gases can be captured; the acid dew point temperature of the flue gas can be reduced, and associated equipment corrosion can be lessened. Sorbents are used more effectively in the present system. This, among other things, increases boiler efficiency, enhances system corrosion resistance, improves material usage, reduces capital costs and operating costs, and improves capture of particulates and/or other contaminants.

During combustion in a boiler, the chemical energy in a fuel is converted to thermal heat, which can be used in various forms for different applications. The fuels used in the combustion process can include a wide range of solid, liquid, and gaseous substances, including coal (with low, medium, or high sulfur content), oil (diesel, No. 2, Bunker C or No. 6), natural gas, wood, tires, biomass, etc.

Combustion in the boiler transforms the fuel into a large number of chemical compounds. Water ($H_2O$) and carbon dioxide ($CO_2$) are the primary products of complete combustion. However, other combustion reactions with chemical components in the fuel result in undesirable byproducts. Depending on the fuel used, such byproducts may include particulates (e.g. fly ash), acid gases such as sulfur oxides ($SO_x$) or halides (HCl, HF) or nitric oxides ($NO_x$), metals such as mercury or arsenic, carbon monoxide (CO), and hydrocarbons (HC). The emissions levels of many of these byproducts will vary depending on the constituents found in the fuel, but can also be altered by the application of emissions control technologies.

The acid dew point temperature (ADP) is the temperature at which the acid gases in the flue gas are expected to begin condensing on the internal portions of the various system components in contact with the flue gas. Such acidic condensation results in corrosion of the system components, and is desirably avoided.

One means of avoiding this corrosion is by designing the heat recovery components so that the lowest expected temperature of the flue gas exceeds the ADP by a suitable margin. By doing so, however, some of the energy that is leaving the boiler envelope (as heat in the flue gas) is not captured. Unrecovered energy directly reduces the efficiency of the boiler, which has an unfavorable impact on the plant heat rate; the increased heat rate is equivalent to reduced plant efficiency. Reduced boiler efficiency also degrades the plant heat rate by requiring additional fan power to handle increased air and gas flows, as well as additional power in fuel and ash handling systems.

It would be desirable to provide systems and methods to remove particulates, gases, and other contaminants from the flue gas while also lessening equipment corrosion and/or improving the boiler efficiency and overall plant efficiency.

BRIEF DESCRIPTION

Disclosed herein are various methods and systems for reducing acid gas (e.g. $SO_x$) emissions in a boiler flue gas stream with a pollution control system that uses a circulating dry scrubber (CDS) or a spray dryer absorber (SDA) for desulfurization by controlling $SO_3$ concentration upstream of the air heater. Briefly, hydrated lime, i.e. a calcium hydroxide powder, is injected into the flue gas upstream of a heat recovery system component, for example between the boiler economizer and a regenerative air heater. This reduces the $SO_3$ concentration and the acid dew point temperature (ADP) of the flue gas, permitting additional heat energy to be captured. Additionally, by reducing the ADP of the flue gas and lowering the temperature of the flue gas exiting the air heater, further improvements in boiler efficiency can be obtained.

In this regard, disclosed in various embodiments herein are flue gas desulfurization systems, comprising: a first sorbent injection point upstream of an air heater; a desulfurization unit downstream of the air heater; and a baghouse downstream of the desulfurization unit, the baghouse separating solid particles from clean gas. The system comprises a second sorbent injection point located between the air heater and the desulfurization unit, or located in the desulfurization unit. Sometimes, the system may further comprise a clean gas recirculation flue leading from downstream of the baghouse to a point upstream of desulfurization unit. The system can further comprise a recycle system for solid particles running from the baghouse to the desulfurization unit. The system can also comprise a sorbent silo feeding at least the first sorbent injection point. A second sorbent silo may be optionally present for feeding the second sorbent injection point.

The desulfurization unit can be a circulating dry scrubber or a spray dryer absorber. The baghouse can be a pulse jet fabric filter, a shake deflate fabric filter, a reverse gas fabric filter, or an electrostatic precipitator.

The air heater can be described as including a hot flow pass and a cold flow pass, the flue gas traveling through the hot flow pass and transferring heat energy to a gas (e.g., air) traveling from an inlet fan through the cold flow pass. The system may further comprise a pre-heater located between the inlet fan and the cold flow pass of the air heater. Alternatively, the system may comprise a cold air bypass around the air heater, so that the gas provided by the inlet fan does not pass through the cold flow pass. Sometimes, the system includes a heated air recirculation flue running from a point downstream of the cold flow pass to a point upstream of the cold flow pass.

The system may comprise a selective catalytic reduction (SCR) unit located upstream of the air heater, the first sorbent injection point being located downstream of the SCR unit.

In such a system, multiple ports are present for hydrated lime injection, allowing for a small fraction of the lime flow to be injected upstream of the air heater and the remainder to be added elsewhere within the desulfurization unit. The total flow of hydrated lime is no greater than that of a CDS-only installation (where hydrated lime is only injected in the circulating dry scrubber). Through application of this system, the same total flow of sorbent facilitates further advantages such as enhanced boiler efficiency (and thus plant efficiency and plant heat rate) while safely operating at a lower flue gas temperature.

Also disclosed herein are methods for increasing boiler efficiency, comprising: injecting hydrated lime into a flue gas at a first hydrated lime injection point upstream of an air heater; reducing the temperature of the flue gas in the air heater; injecting hydrated lime into the flue gas at a second hydrated lime injection point downstream of the air heater; sending the flue gas through a desulfurization unit downstream of the air heater and downstream of the second hydrated lime injection point; and sending the flue gas through a baghouse downstream of the desulfurization unit, the baghouse separating solid particles from clean gas; wherein the temperature of the flue gas after exiting the air heater is less than the temperature of the flue gas after exiting the air heater in a system where hydrated lime is not injected at the first hydrated lime injection point (preferably at least 10° F. less, including at least 20° F. less or 30° F. less).

The flue gas entering the air heater may have a temperature from about 600° F. to about 800° F. The flue gas exiting the air heater (including the effects of air heater leakage, if any) may have a temperature from about 220° F. to about 350° F.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
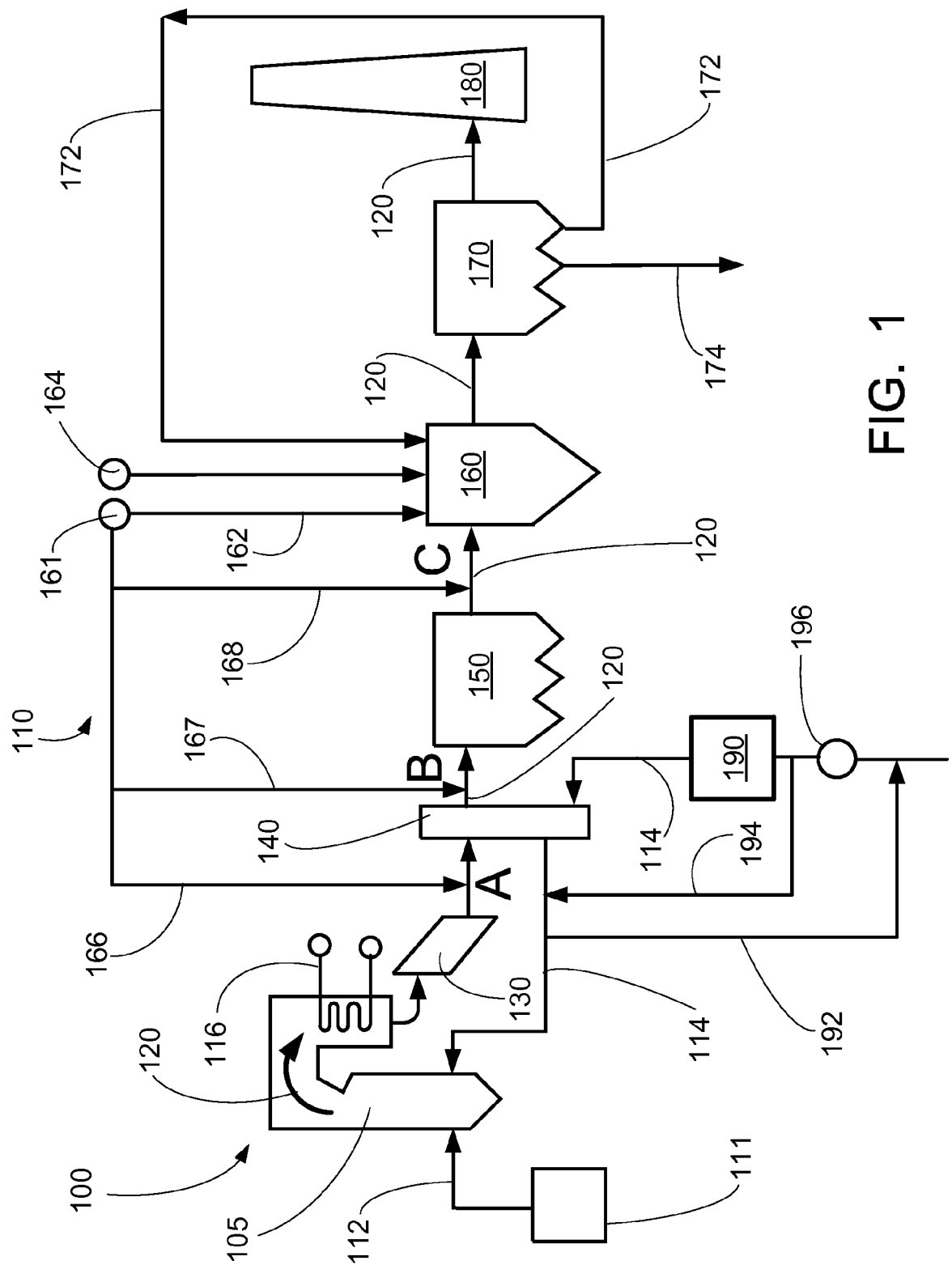
FIG. 1 is a diagram illustrating the components and flow paths of a conventional boiler with a dry desulfurization system.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the fluid flows through an upstream component prior to flowing through the downstream component. It should be noted that in a loop, a first component can be described as being both upstream of and downstream of a second component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the earth. The terms "upwards" and "downwards" are also relative to an absolute reference; an upwards flow is always against the gravity of the earth.

The term "hydrated lime" refers to calcium hydroxide, also known as $Ca(OH)_2$. The term "hydrated" when used here does not mean that molecular water is present. The term "lime slurry" is used to refer to a mixture of calcium hydroxide with water. Other calcium sorbents include, for example, limestone or quicklime. The term "limestone" refers to calcium carbonate, also known as $CaCO_3$. The term "quicklime" refers to calcium oxide, CaO.

The term "plane" is used herein to refer generally to a common level, and should be construed as referring to a volume, not as a flat surface.

The term "directly," when used to refer to two system components, means that no significant system components are in the path between the two named components. However, minor components, such as valves or pumps or other control devices, or sensors (e.g. temperature or pressure), may be located in the path between the two named components.

To the extent that explanations of certain terminology or principles of the boiler and/or steam generator arts may be necessary to understand the present disclosure, the reader is referred to *Steam/its generation and use*, 40th Edition, Stultz and Kitto, Eds., Copyright 1992, The Babcock & Wilcox Company, and to *Steam/its generation and use*, 41st Edition, Kitto and Stultz, Eds., Copyright 2005, The Babcock & Wilcox Company, the texts of which are hereby incorporated by reference as though fully set forth herein.

The present disclosure relates to various methods and systems for reducing acid gas emissions and associated corrosion during desulfurization. Very generally, a flue gas is generated by a combustion system containing a combustion chamber in which fuel is combusted. A dry calcium hydroxide powder (i.e. hydrated lime) is injected into the flue gas upstream of the air heater, i.e. earlier in the system to reduce the acid dew point (ADP) temperature at an earlier point in the system. This permits the flue gas to exit the air heater at a lower outlet temperature while preventing condensation of acid gases. This allows for the capture of additional heat energy which would otherwise be wasted. The flue gas continues to a desulfurization unit, such as a circulating dry scrubber (CDS) or a spray dryer absorber (SDA), where $SO_x$ is captured. The resulting flue gas, now containing solid particles and clean gas, passes through a downstream baghouse to separate the solid particles from the clean gas. The solid particles can be recycled back to the desulfurization unit as desired.

Generally, it is considered that the present desulfurization systems and methods can be used in combination with any combustion system. The combustion can be used for any purpose, for example to generate power, produce a certain product, or simply to incinerate a given fuel. Exemplary combustion systems in which the present methods may be applicable include power generation systems that use a boiler having a furnace as the combustion chamber; cement kilns; electric arc furnaces; glass furnaces; smelters (copper, gold, tin, etc.); pelletizer roasters; blast furnaces; coke oven batteries; chemical fired heaters; refinery ovens; and incinerators (medical waste, municipal solid waste, etc.). The term "combustion chamber" is used herein to refer to the specific structure within the system in which combustion occurs.

FIG. 1 generally illustrates an exemplary power generation system of the present disclosure with a boiler 100 and a downstream desulfurization system 110. A fossil fuel 112, such as coal from a pulverizer 111, and air 114 are burned in the furnace 105, resulting in the generation of a flue gas 120. The flue gas 120 passes an economizer 116 used to preheat the water used in the boiler to produce steam and to cool the flue gas 120. Other heat transfer surfaces upstream of the economizer 116 are not shown. The economizer 116 in FIG. 1 represents the last steam or water heat transfer surface in the boiler in the direction of gas flow out of the boiler, and can instead be a superheater surface, a reheater surface, or an evaporator surface depending on the type of boiler applied. The flue gas 120 then flows downstream and enters a selective catalytic reduction (SCR) unit 130, which may or may not be present, to remove nitrogen oxides ($NO_x$) from the flue gas 120.

Next, dry sorbent is injected into the flue gas at a first dry sorbent injection point A prior to the flue gas entering the air heater 140. The first injection point A is upstream of the air heater 140, and can be described as being located between the economizer 116 and the air heater 140. Dry sorbent travels to injection point A from sorbent supply 161 via line 166. If an SCR unit 130 is present, the first injection point A can be described as being located directly between the SCR unit 130 and the air heater 140, or as being downstream of the SCR unit. An alternate (or additional) location of dry sorbent injection (not depicted) can be provided upstream of the SCR unit 130 if deemed appropriate for the specific application. This injection of dry sorbent reacts with $SO_x$, reducing the amount of $SO_x$ in the flue gas stream and thus reducing the ADP.

The flue gas 120 then passes through an air heater 140 that cools the flue gas 120 and heats the air 114 entering the furnace 105. The air heater can be a recuperative air heater or a regenerative air heater. The addition of dry sorbent upstream of the air heater permits the outlet temperature of the flue gas to be lower without incurring corrosion. Put another way, more of the heat energy in the flue gas can be transferred to the air 114 entering the furnace and recirculated back to the boiler. This facilitates the achievement of higher boiler efficiency while maintaining equivalent equipment protection and reliability. The temperature of the flue gas 120 after exiting the air heater 140 is less than the temperature of the flue gas 120 after exiting the air heater 140 in a system where sorbent is not injected at the first sorbent injection point. In particular embodiments, the temperature of the flue gas 120 after exiting the air heater 140 is at least 10° F. less than, at least 20° F. less than, or at least 30° F. less than the temperature of the flue gas 120 after exiting the air heater 140 in a system where sorbent is not injected at the first sorbent injection point.

After passing through the air heater 140, the flue gas 120 typically has a temperature of about 240° F. to about 280° F. (115° C. to 138° C.). If desired, the flue gas 120 then passes through a particulate collection device 150 to collect fly ash and other large particles. This particulate collection device 150 is optional, and is usually not present. When present, the collected particles are then recycled to the desulfurization unit 160.

Additional dry sorbent is injected into the flue gas at a second sorbent injection point between the air heater 140 and the desulfurization unit 160, or in the desulfurization unit itself. Two such second sorbent injection points are marked with letters B and C. These second injection points are fed by sorbent supply 161 via lines 167 and 168, respectively. In embodiments, the ratio of the injection rate of sorbent at the first sorbent injection point to the second sorbent injection point is from about 1:99 to about 10:90, as measured in pounds/hour at each injection point.

The desulfurization unit 160 is a circulating dry scrubber (CDS), or a spray dryer absorber (SDA), or a circulating fluidized bed (CFB) scrubber. In a CDS as depicted here, dry sorbent 162 and water 164 are injected into the flue gas to react with sulfur oxides ($SO_x$) and halides (HCl, HF) and to further cool the flue gas 120 to a range of about 140° F. to about 210° F. (60° C. to 99° C.). Separate injection of dry sorbent and water permits easy adjustment of the lime feed for variable $SO_x$ concentrations and permits the use of lower-quality water. In the desulfurization unit 160, the water is evaporated. In an SDA, an atomized alkaline slurry, such as a lime slurry, is sprayed into the flue gas to clean and cool the flue gas. In a CFB scrubber, dry sorbent is introduced into a fluidized bed, and the flue gas is used as the fluidizing gas. In particular embodiments, it is contemplated that hydrated lime is used as the dry sorbent in the desulfurization unit. In particular embodiments, the desulfurization unit is a circulating dry scrubber (CDS).

The resulting cleaned and particle-laden flue gas 120 is conveyed to a baghouse 170, such as a fabric filter or an electrostatic precipitator, to remove the particles from the flue gas 120. The cleaned flue gas 120 is then sent to a stack 180.

A recycle stream 172 from the baghouse 170 can be used to collect the solid alkaline particles and recycle them from the baghouse back to the desulfurization unit 160, particularly when a CDS is used. This recirculation gives unreacted reagent multiple opportunities to pass through the desulfurization unit 160 and react with sulfur oxides, leading to high reagent utilization. Fresh dry sorbent 162 can be added as well to replace any used dry sorbent. Particles can also be removed from the baghouse 170 and disposed of, indicated here with reference numeral 174.

Injection of dry sorbent at the first injection point A is especially useful when an SCR unit 130 and/or CO catalyst is present, as these catalysts tend to increase the conversion of $SO_2$ to $SO_3$. This increases the acid dew point temperature (ADP) of the flue gas.

Additional design features can be used to control the exit gas temperature of the flue gas from the air heater (i.e. reference numeral 140), mainly by controlling the temperature of the inlet air 114 that is sent to the boiler. Three such features are illustrated in FIG. 1. It is contemplated that any of the six possible combinations of these features may be used. Temperature control is useful for events such as combustion of off-design fuel, operation at off-design ambient conditions (e.g. temperature, pressure, humidity), or operation at partial boiler loads.

In this regard, the air heater 140 can be considered as having a hot flow pass and a cold flow pass. The designations of "hot" and "cold" are relative to each other, rather than to an absolute temperature. The flue gas 120 travels through the hot flow pass, and the inlet air 114 travels through the cold flow pass. Heat energy is transferred from the flue gas in the hot flow pass to the air traveling through the cold flow pass. An inlet fan 196 provides the inlet air.

The first feature is a pre-heater 190, which is located between the inlet fan 196 and the cold flow pass inlet of the air heater 140. This heater can use steam or hot water to preheat the inlet air, which limits heat transfer from the flue gas. The second feature is a heated air recirculation flue 192 which runs from a point downstream of the cold flow pass outlet to a point upstream of the cold flow pass inlet. This flue takes a relatively small stream of heated air and returns it to the inlet to be mixed with ambient air, changing the temperature gradient in the air heater. The third feature is a cold air bypass 194 around the air heater 140 so that a portion of the inlet air is not warmed at all. This feature limits heat transfer from the flue gas to the inlet gas as well.

It is noted that SDA generally requires the incoming flue gas to have a minimum temperature of about 220° F. in order to evaporate water, while CDS requires a somewhat lower minimum temperature. Thus, the desulfurization unit must be integrated with the dry sorbent injection. Conventional application of flue gas desulfurization technology controls acid gas emissions, but does not impact the overall plant efficiency/plant heat rate as occurs in the present disclosure. It is noted that FIG. 1 illustrates the use of one dry sorbent injected at two or more different injection points and fed from the same (i.e. a single) sorbent supply. However, it is more likely that each injection point will have its own supply because the feed rates between the two injection points can vary by a factor of 10 to 20 (with the second injection point receiving the most sorbent). It is also contemplated that two different sorbents could be applied if desired.

In conventional systems and methods, dry sorbent is only injected at a location corresponding to the second dry sorbent injection point of the present disclosure. The systems designer typically determines a proper flow rate for the dry sorbent that is needed to obtain the desired extent of $SO_x$ reduction. In the present disclosure, a fraction of the dry sorbent is diverted to the first dry sorbent injection point. As previously stated, the ratio of the injection rate of sorbent at the first sorbent injection point to the second sorbent injection point is from about 1:99 to about 10:90, as measured in pounds/hour at each injection point. As a result, the total dry sorbent rate flow is unchanged. It is noted that the re-distribution of the dry sorbent alone will not improve the boiler efficiency and overall plant efficiency. Rather, the design of the injection systems, the desulfurization unit, and the air heater must be coordinated to increase these efficiencies. The flue gas temperature exiting the air heater must be optimized to balance efficiency gains with suitable conditions for operation of the desulfurization unit. In particular, the injection of dry sorbent upstream of the air heater permits additional heat energy to be captured. This means that less fuel needs to be combusted, so that less $SO_x$ is generated and the amount of sorbent used per unit of energy is reduced. Generally, this means that total sorbent consumption is reduced as well. As a result, fuel and sorbent costs are reduced, and auxiliary power plant consumption is also reduced. This results in more cost-effective production of electricity.

The increase in boiler efficiency also has an impact on the design of the desulfurization unit, particularly the CDS absorber tower. Since CDS is a volumetric device and an increase in boiler efficiency equates to a decreased volumetric gas flow (due to less fuel and lower inlet gas temperature), the corresponding CDS absorber diameter needed to handle the gas flow will also be decreased. The smaller diameter absorber tower allows for better contact between the gas, liquid, and solid phases which should equate to a better wetting of the solid particles. Put another way, due to the lower volumetric flue gas flow, a smaller CDS absorber tower can be used and still achieve the same efficiency.

Figure 2:
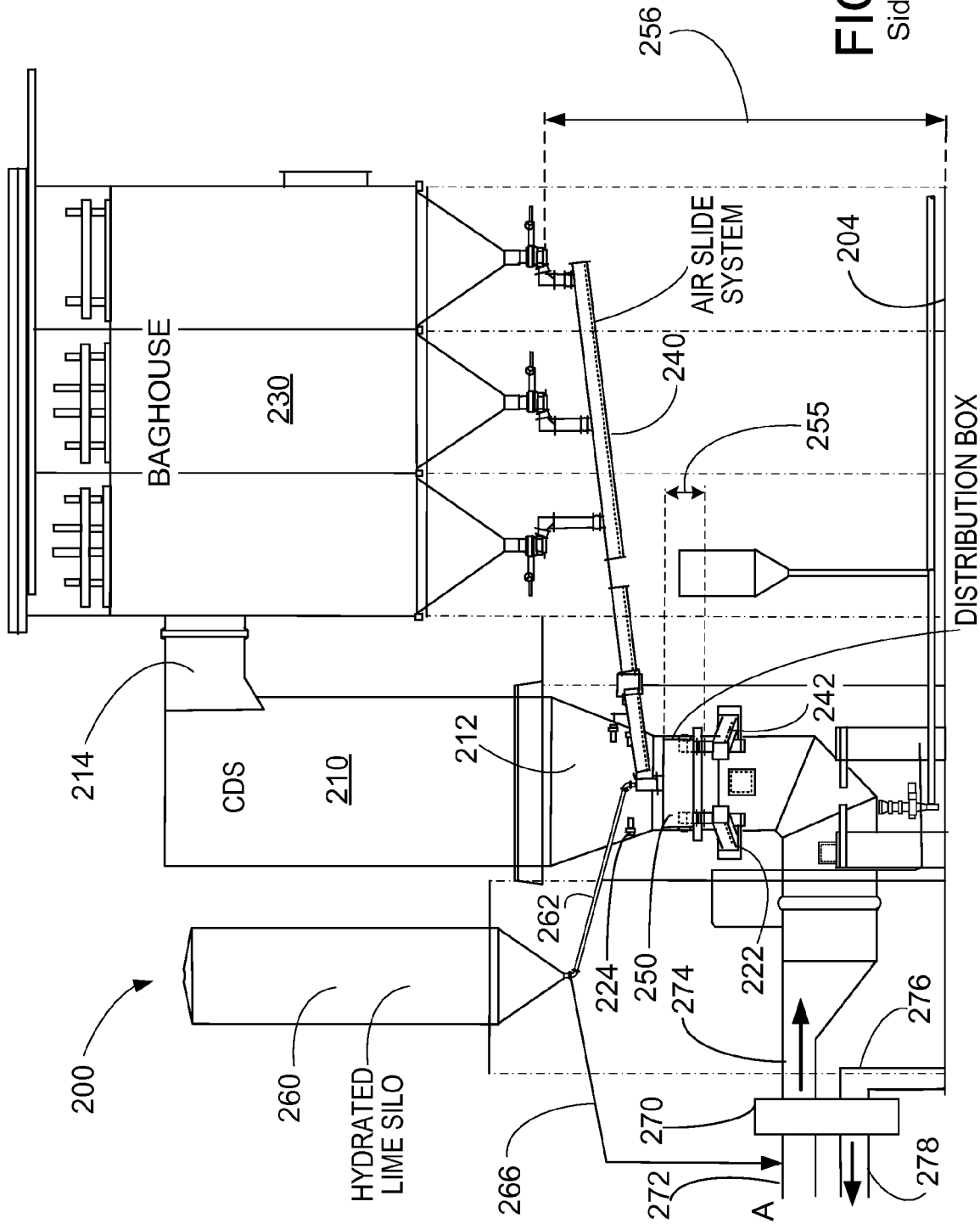
FIG. 2 is a side view of a conventional desulfurization system using a distribution box.
Figure 3:
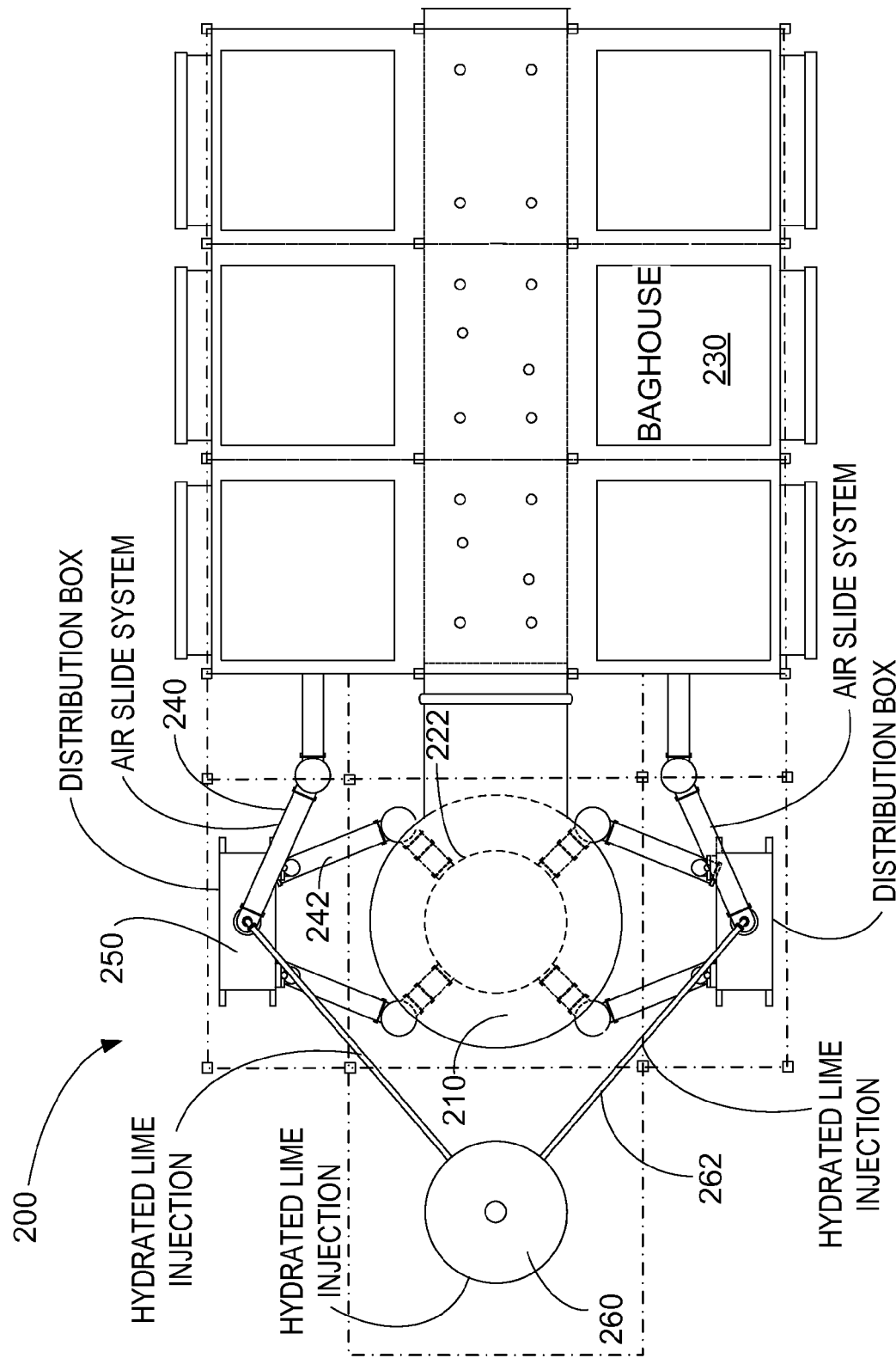
FIG. 3 is a plan (top) view of the conventional system of FIG. 2.
Figure 4:
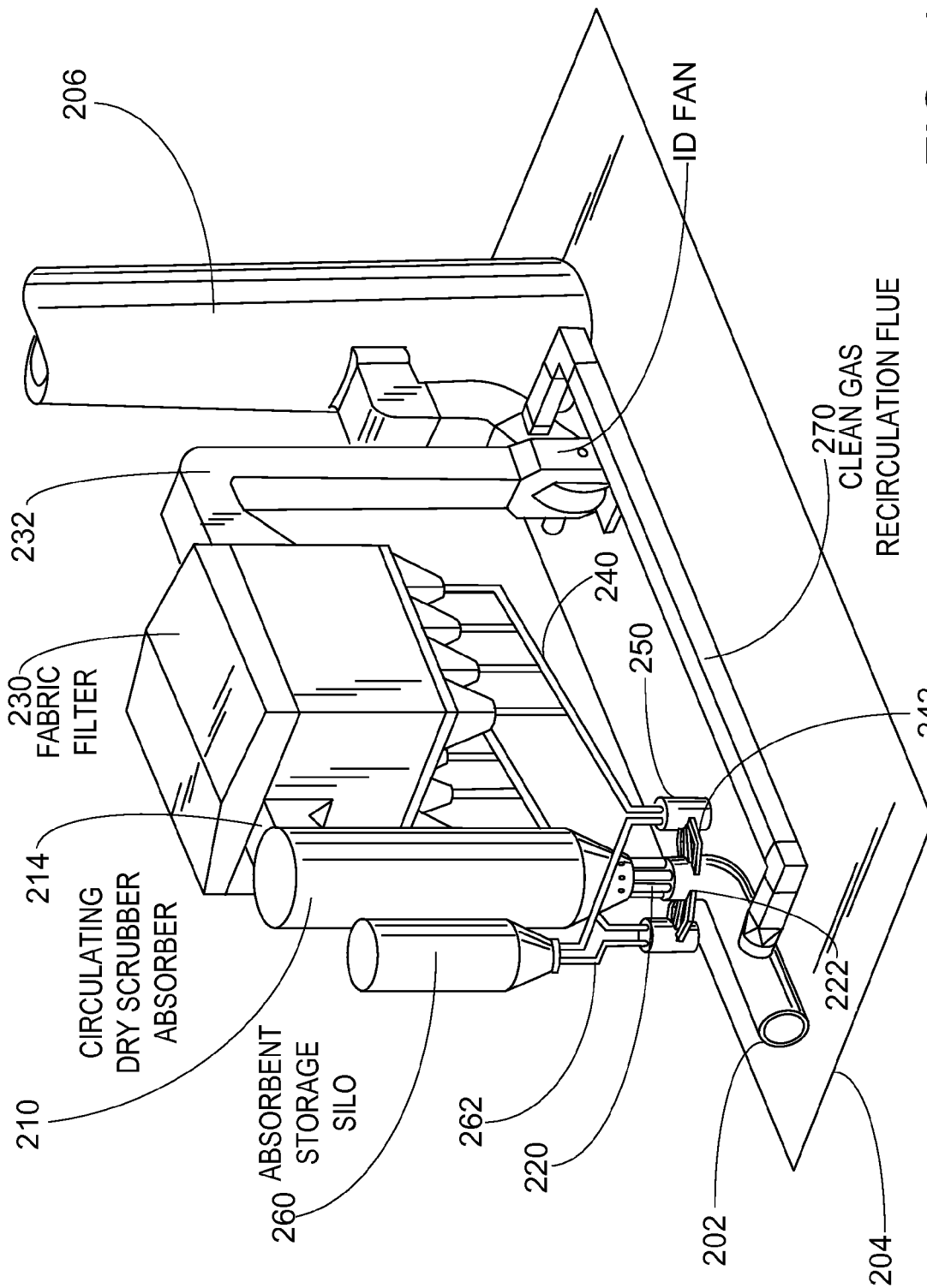
FIG. 4 is a perspective view of the conventional system of FIG. 2.

FIG. 2 and FIG. 3 provide some additional detail on a conventional recycle system 200 used to return solid particles back to a CDS absorber vessel in an exemplary embodiment of the present disclosure. FIG. 2 is a side view, and FIG. 3 is a plan view (i.e. from the top). FIG. 4 is a perspective view of a similar recycle system.

Referring initially to FIG. 2, untreated flue gas enters from the left side and passes through the air heater 270. The hot flow pass inlet 272 and the hot flow pass outlet 274 are shown. A hydrated lime silo has a channel 266 which injects hydrated lime sorbent into the flue gas at injection point A upstream of the air heater. Also shown is the cold flow pass inlet 276 and the cold flow pass outlet 278, through which inlet air flows. Heat energy in the flue gas is transferred to this inlet air. The flow directions are indicated with arrows. The particulate collection device illustrated in FIG. 1 (reference numeral 150) is not included here.

Continuing with FIG. 2, to the right of the air heater 270 the flue gas enters a channel to the pollution control system, which is at a low elevation relative to grade 204. The channel then turns vertically so that the flue gas flows upwards through Venturis 220 (see FIG. 4) into a bottom inlet 212 of the circulating dry scrubber (CDS) absorber vessel 210. As the flue gas flows upwards, the flue gas passes through solids injection points 222 which are upstream of the Venturis 220. This illustration, as seen in FIG. 3, shows four Venturis. Water injection points 224 are located at the base of the absorber vessel 210 and downstream of the Venturis 220. Solid particles and cleaned gas then flow from a top outlet 214 of the absorber vessel into the baghouse 230. The baghouse 250 is elevated a certain height 255 above grade 204.

Next, the solid particles are removed from the gas stream, and some of the solid particles are recirculated back from the baghouse to the absorber vessel. The solid particles exit the baghouse 230 through hoppers onto an air slide 240. One or two air slides can be used, depending on the size and the arrangement of the baghouse. The solid particles then need to be split approximately evenly onto a second set of air slides equal to the number of solids injection points.

This can be done using a distribution box 250. The air slides 240 lead from the baghouse 230 to the distribution box 250. Here, two distribution boxes are shown. The distribution box divides the solid particle flow from the baghouse into two different streams, which then travel down another air slide 242 to a solids injection point 222. In FIG. 3 there are four solids injection points, while in FIG. 4, there are six solids injection points, one for each Venturi 220, evenly spaced around the absorber vessel 210. Each air slide has a minimum slope of seven (7) degrees to achieve flow. The distribution box 250 generally has a height 255 of about 8 feet to about 15 feet. It should be noted that as seen in FIG. 3, the distribution boxes are located to the sides of the absorber vessel, not underneath the absorber vessel, i.e. the distribution box does not affect the height of the absorber vessel.

A hydrated lime silo 260 has a channel 262 leading from the hydrated lime silo to each distribution box 250. As seen in FIG. 4, fresh hydrated lime is injected into the distribution box 250, or alternatively into the top of the CDS absorber vessel 210 (not shown). The distribution box also mixes the solid particles with the fresh hydrated lime. Generally, the fresh hydrated lime silo 260 is elevated above the injection point so that at least a 15° slope can be achieved from the silo to the injection point, permitting fresh hydrated lime to be fed by gravity.

Referring still to FIG. 4, the clean gas exits the baghouse 230 through duct 232 to a stack 206 downstream of the baghouse, from which the clean gas can be vented to atmosphere. A clean gas recirculation flue 270 is also seen, which recycles clean flue gas from downstream of the baghouse 230 to a point upstream of the solids injection point 222.

The baghouse may in various embodiments be an electrostatic precipitator (ESP), a reverse gas fabric filter, a shake deflate fabric filter, or a pulse jet fabric filter. Desirably, the baghouse is either a pulse jet fabric filter (PJFF) or a reverse gas fabric filter. In this regard, a baghouse is preferable to an ESP due to the desulfurization ability of the fabric filter compared to an ESP. In other words, the fabric filter can capture pollutants that are in the vapor phase due to buildup of a filter cake, whereas an ESP only traps particles and does not significantly capture vapor-phase pollutants.

The separate systems of this disclosure and components needed for their integration are within the ordinary skill of the art. The devices, valves, piping, sensors, connections, and fittings used therein are also generally commercially available. Designs for practicing the methods of this disclosure are also within the ordinary skill of the art.

EXAMPLES

Example 1

In a proposed application involving medium sulfur coal, the expected acid dew point temperature (ADP) based on uncontrolled $SO_3$ formation was calculated to be 289° F. leaving the air heater. Application of dry sorbent injection (DSI) upstream of the air heater lowered the expected ADP to 256° F. The difference between these temperatures (33° F.) represents energy that could be safely recovered with typical heat transfer equipment and no additional corrosion risk. To realize this benefit by transferring additional heat, the boiler's economizer and air heater surfaces can be increased. The boiler efficiency gain associated with this method was approximately 0.8%. Resulting auxiliary power consumption improved as well, and total sorbent consumption was reduced by the same 0.8% (since 0.8% less flue gas and associated emissions were produced). $CO_2$ emissions were likewise reduced by 0.8% because less fuel is combusted. Because of the improved boiler efficiency realized in the integrated system, expected sorbent consumption was reduced while maintaining the same stack outlet emissions concentrations.

In some situations, it is envisioned that integrating the dry sorbent injection with the desulfurization unit could reduce the ADP at the air heater by as much as 45° F. to 50° F. Resulting boiler efficiency improvement could be about 1.2%.

Example 2

Figure 5:
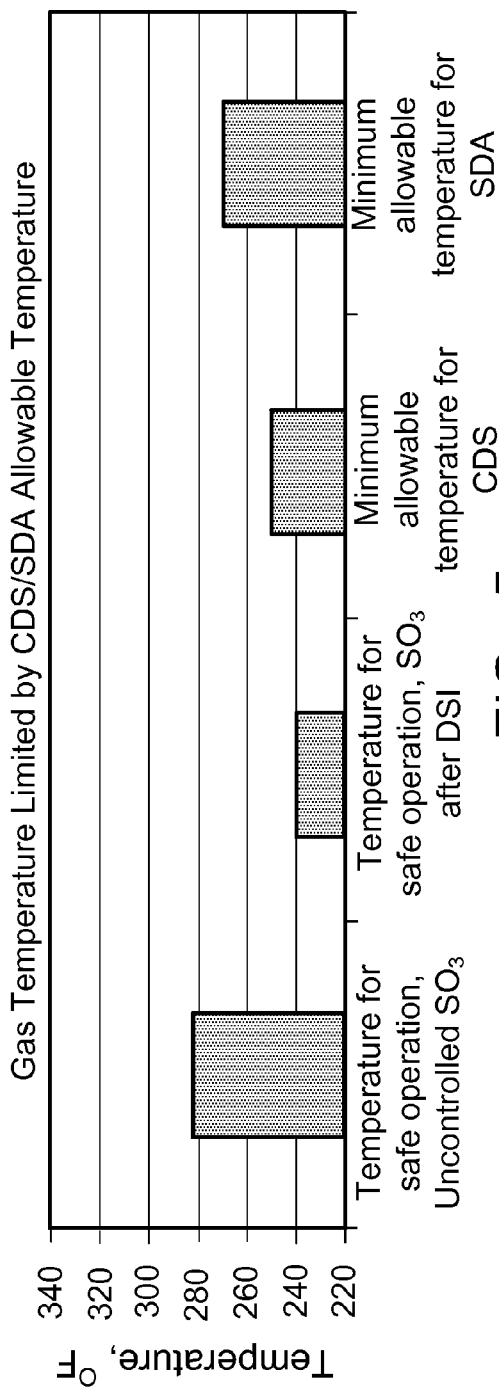
FIG. 5 is a bar graph comparing temperatures for one prophetic example of flue gas temperature exiting the air heater with no dry sorbent injection (DSI) upstream of the air heater, with DSI upstream of the air heater, and minimum allowable temperatures for CDS and SDA (desulfurization technologies). The y-axis is temperature in ° F.

As illustrated in FIG. 5, applying dry sorbent upstream of the air heater permits the safe operating flue gas exit temperature (at the hot flow pass outlet) to be reduced to 240° F. If CDS is chosen for desulfurization, the integrated system could be designed for 250° F., thus achieving 30° F. reduction from the case when dry sorbent is not applied upstream (280° F.). If SDA is chosen for desulfurization, a temperature of 270° F. can be designed for. Again, total sorbent consumption is no greater than the initial "uncontrolled" scenario; in fact, sorbent consumption is reduced since less fuel is combusted and less $SO_3$ is generated in the boiler.

Example 3

Figure 6:
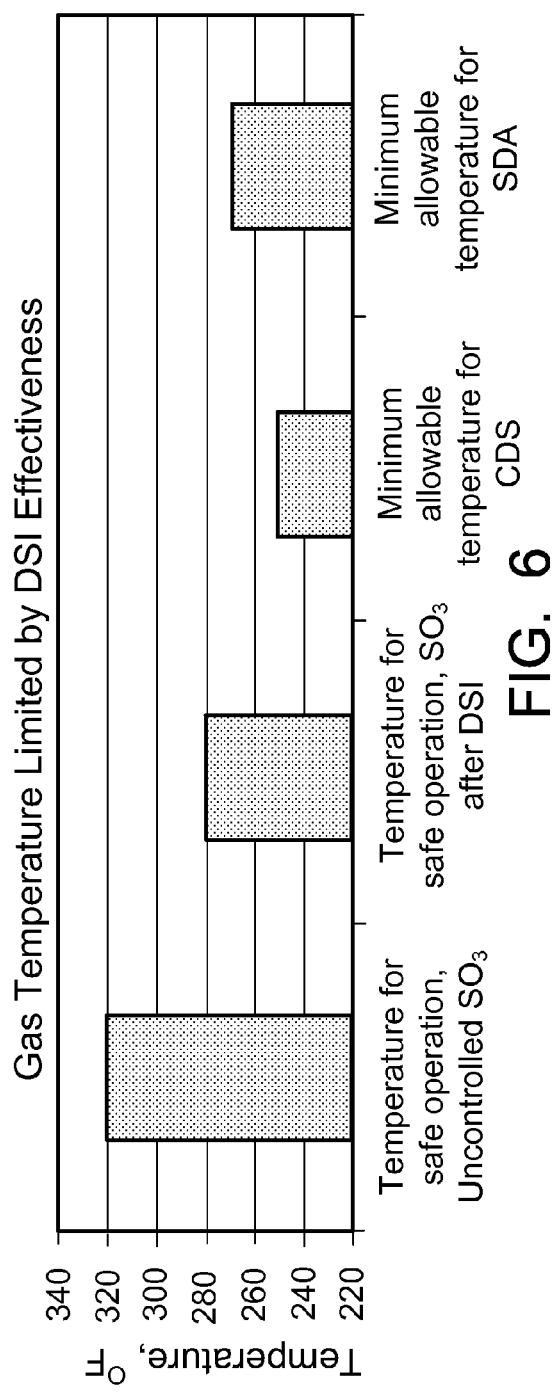
FIG. 6 is a bar graph comparing temperatures for another prophetic example of flue gas temperature exiting the air heater with no dry sorbent injection (DSI) upstream of the air heater, with DSI upstream of the air heater, and minimum allowable temperatures for CDS and SDA (desulfurization technologies). The y-axis is temperature in ° F.

In this example illustrated in FIG. 6, the safe operating air heater exit gas temperature for the flue gas can be reduced from 320° F. to 280° F. Both CDS and SDA can operate effectively at 280° F., so the integrated system permits this 40° F. reduction in flue gas temperature. Again, the total sorbent consumption has been reduced as described above. The overall emissions coming from the boiler decrease due to reduced fuel flow (better plant efficiency).

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A flue gas desulfurization system, comprising:
   a first dry sorbent injection point upstream of an air heater and downstream of a last heat transfer surface in a boiler in a direction of gas flow out of the boiler;
   a desulfurization unit downstream of the air heater; and
   a baghouse downstream of the desulfurization unit, the baghouse separating solid particles from clean gas.

2. The system of claim 1, further comprising a second dry sorbent injection point located between the air heater and the desulfurization unit, or located in the desulfurization unit.

3. The system of claim 1, wherein the desulfurization unit is a circulating dry scrubber or a spray dryer absorber.

4. The system of claim 1, further comprising a clean gas recirculation flue leading from downstream of the baghouse to a point upstream of the desulfurization unit.

5. The system of claim 1, further comprising a recycle system for solid particles running from the baghouse to the desulfurization unit.

6. The system of claim 1, further comprising a dry sorbent silo feeding the first dry sorbent injection point.

7. The system of claim 1, wherein the baghouse is a pulse jet fabric filter, a shake deflate fabric filter, a reverse gas fabric filter, or an electrostatic precipitator.

8. The system of claim 1, wherein the air heater includes a hot flow pass and a cold flow pass, the flue gas traveling through the hot flow pass and transferring heat energy to gas traveling from an inlet fan through the cold flow pass.

9. The system of claim 8, further comprising a pre-heater located between the inlet fan and the cold flow pass of the air heater.

10. The system of claim 9, further comprising a cold air bypass around the air heater, so that gas provided by the inlet fan does not pass through the cold flow pass.

11. The system of claim 8, further comprising a heated air recirculation flue running from a point downstream of an outlet of the cold flow pass to a point upstream of an inlet of the cold flow pass.

12. The system of claim 8, further comprising a selective catalytic reduction (SCR) unit located upstream of the air heater, the first dry sorbent injection point being located downstream of the SCR unit or being located upstream of the SCR unit.

13. A method for increasing boiler efficiency, comprising:
injecting hydrated lime into a flue gas at a first hydrated lime injection point upstream of an air heater and downstream of a last heat transfer surface in a boiler in a direction of gas flow out of the boiler;
reducing the temperature of the flue gas in the air heater;
injecting hydrated lime into the flue gas at a second hydrated lime injection point downstream of the air heater;
sending the flue gas through a desulfurization unit downstream of the air heater and downstream of the second hydrated lime injection point; and
sending the flue gas through a baghouse downstream of the desulfurization unit, the baghouse separating solid particles from clean gas;
wherein the temperature of the flue gas after exiting the air heater is less than the temperature of the flue gas after exiting the air heater in a system where hydrated lime is not injected at the first hydrated lime injection point.

14. The method of claim 13, wherein flue gas entering the air heater has a temperature of about 600° F. or greater.

15. The method of claim 13, wherein flue gas exiting the air heater has a temperature from about 220° F. to about 350° F.

16. The method of claim 13, wherein the desulfurization unit is a circulating dry scrubber or a spray dryer absorber.

17. The method of claim 13 wherein the temperature of the flue gas after exiting the air heater is at least 30° F. less than the temperature of the flue gas after exiting the air heater in a system where hydrated lime is not injected at the first hydrated lime injection point.

* * * * *